H. B. KRAUT.
SHEARING OR PUNCHING MACHINE.
APPLICATION FILED NOV. 17, 1910.

1,035,094.

Patented Aug. 6, 1912.
3 SHEETS—SHEET 1.

Witnesses:
Harry S. Gaither
William Goldberger.

Inventor:
Hans. B. Kraut
by William W. Hall atty

H. B. KRAUT.
SHEARING OR PUNCHING MACHINE.
APPLICATION FILED NOV. 17, 1910.
1,035,094.
Patented Aug. 6, 1912.
3 SHEETS—SHEET 2.
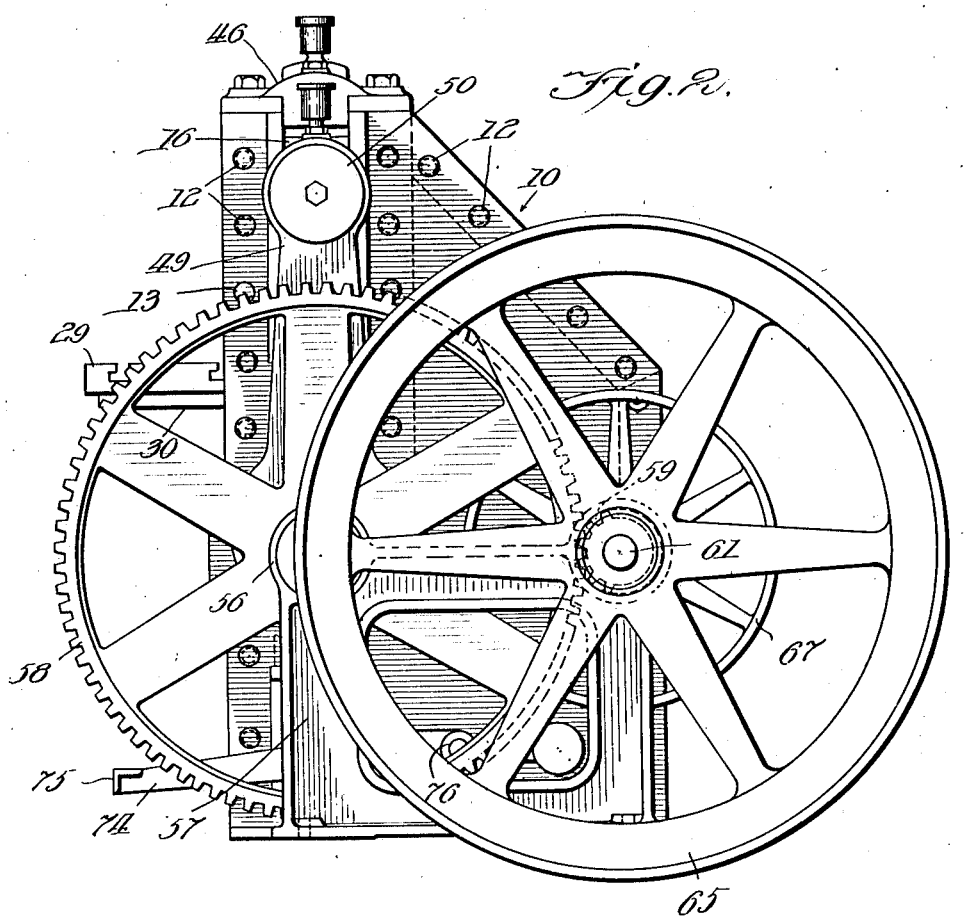
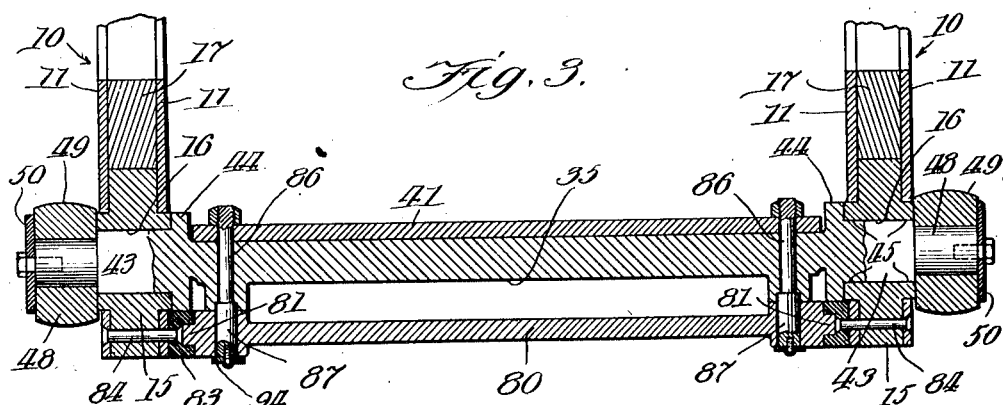

H. B. KRAUT.
SHEARING OR PUNCHING MACHINE.
APPLICATION FILED NOV. 17, 1910.

1,035,094.

Patented Aug. 6, 1912.
3 SHEETS—SHEET 3.

Witnesses:
Harry S. Gaither
William Goldberger

Inventor:
Hans B. Kraut
by William H. Hall, atty

UNITED STATES PATENT OFFICE.

HANS B. KRAUT, OF CHICAGO, ILLINOIS, ASSIGNOR TO JOSEPH T. RYERSON & SON, OF CHICAGO, ILLINOIS, A CORPORATION OF ILLINOIS.

SHEARING OR PUNCHING MACHINE.

1,035,094.  Specification of Letters Patent.  Patented Aug. 6, 1912.

Application filed November 17, 1910. Serial No. 592,803.

*To all whom it may concern:*

Be it known that I, HANS B. KRAUT, a citizen of the United States, and a resident of Chicago, in the county of Cook and State of Illinois, have invented certain new and useful Improvements in Shearing or Punching Machines; and I do hereby declare that the following is a full, clear, and exact description thereof, reference being had to the accompanying drawings, and to the characters of reference marked thereon, which form a part of this specification.

This invention relates to improvements in gate shearing machines for shearing metal plates and like material, and refers also to improvements in certain structural details of shearing machines which may be used in other types of shearing machine and also punching machines.

The invention consists in the matters hereinafter set forth and more particularly pointed out in the appended claims.

Figure 1:
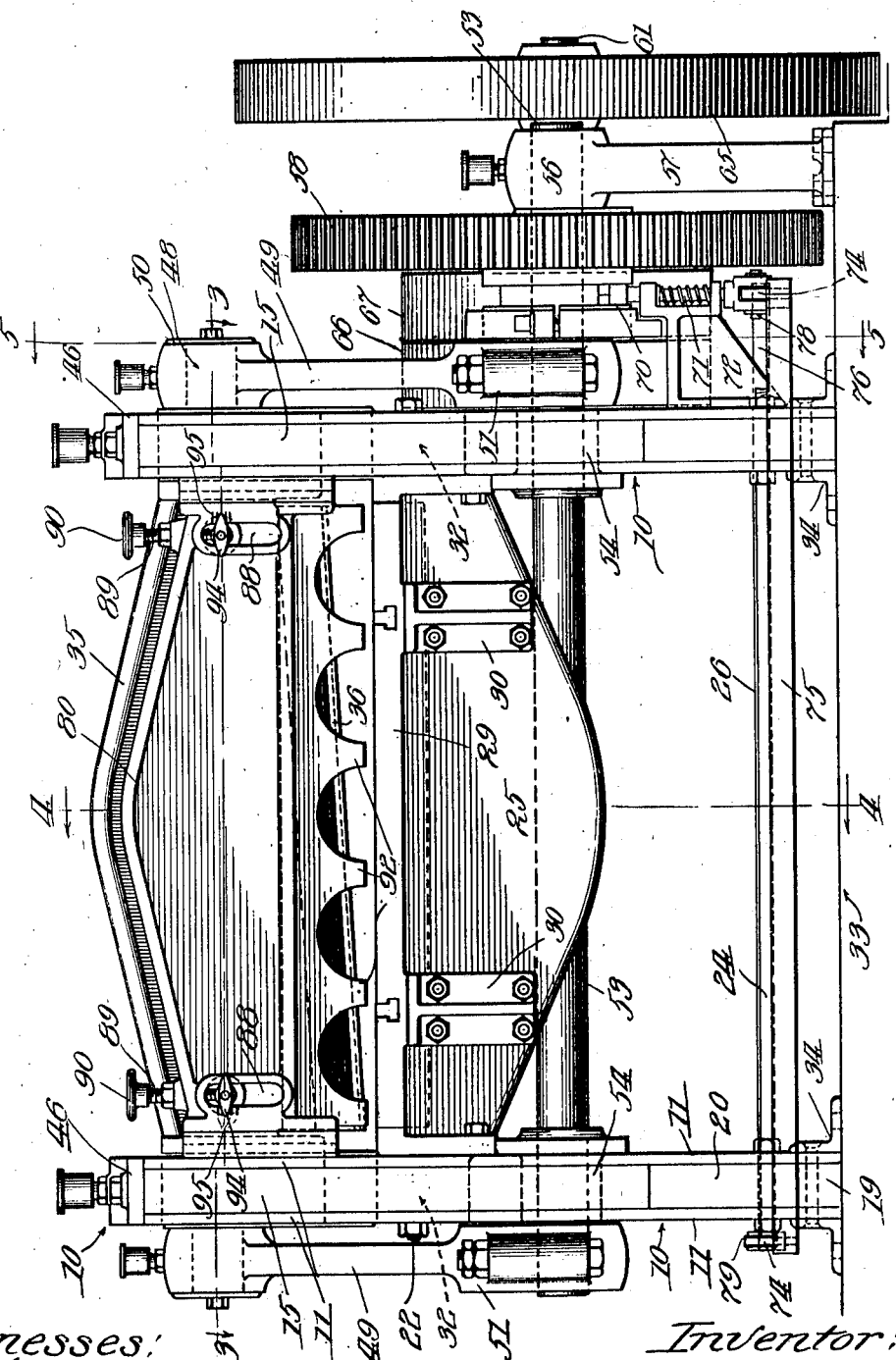
Figure 5:
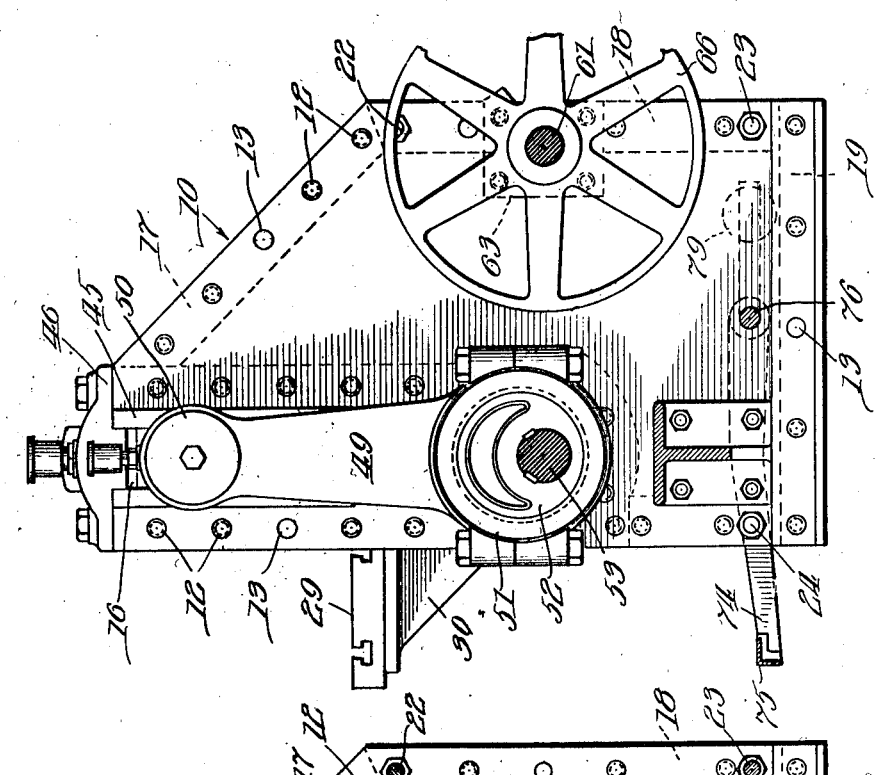
Figure 4:
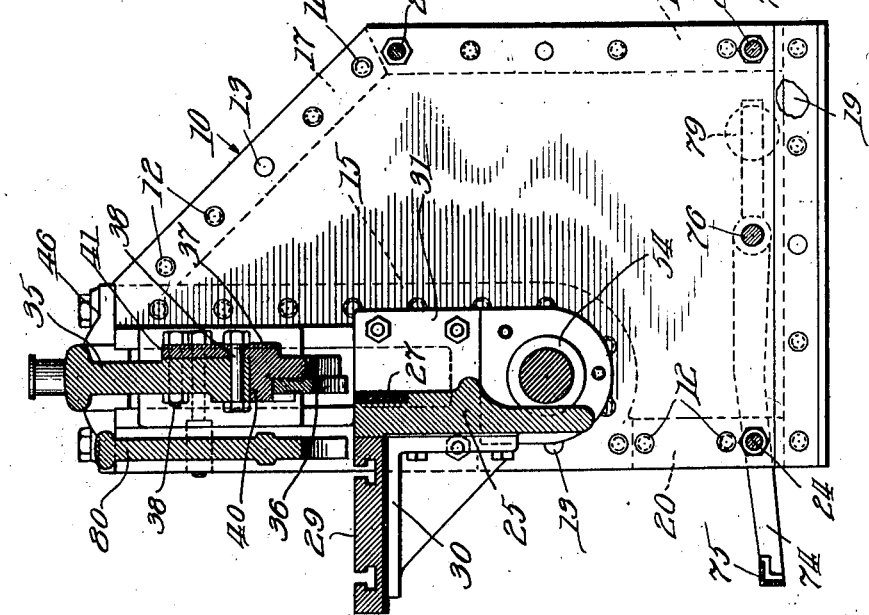

In the drawings,—Figure 1 is a front elevation of a shearing machine embodying my invention. Fig. 2 is an elevation of the right hand end of the machine. Fig. 3 is a horizontal section on line 3—3 of Fig. 1. Fig. 4 is a central transverse vertical section of the machine, on the line 4—4 of Fig. 1. Fig. 5 is a vertical section on the line 5—5 of Fig. 1, looking in the direction indicated by the arrows.

The frame of the machine comprises two generally similar end frames 10, 10, the outline of which is shown in Figs. 2, 4 and 5, each consisting of two plates 11, 11 and filler pieces between the same and attached together by the rivets and pins 12, 13, respectively, in the manner shown in my prior application for United States Letters Patent, Serial Number 578,388, filed August 22nd, 1910. The filler pieces of each end frame comprise the slotted or horse shoe shape cast metal guide 15 at the front of the frame, the slots 16 of which open upwardly, the rear, oblique and vertical marginal filler bars 17, 18, respectively, the bottom filler bar 19 and the short front filler bar 20 extending upwardly from the bottom filler bar to the slotted guide casting 15; said filler bars 17, 18, 19 and 20 being located at the margins of the end frames. The outlines of said filler members are clearly shown in Figs. 4 and 5. The said end frames are connected by the tie rods 22, 23 and 24, and by a cast metal shear bolster 25, the latter located at the front of the machine and constituting the support for the lower or fixed blade 27 of the machine, as will hereinafter more fully appear. Said bolster also supports the horizontal work table 29 upon which the material rests, and may be clamped while being sheared, the table being supported from the bolster 25 by the brackets 30. The said bolster may be provided at its ends with flanges 31, through the medium of which it may be bolted or otherwise secured to the end frames, and may also be provided with the end extension 32 (shown in dotted lines in Fig. 1) to fit in the lower ends of the slots 16 of the guide casting 15.

The frame may be supported on a bed plate 33 through the medium of angle bars 34, 34 bolted to the lower margins of said end members and to said bed frame.

35 designates a vertically reciprocating head or gate which carries the movable shear blade 36, said blade being bolted directly to the blade holder 37, (Fig. 4) which is in turn bolted to the head by means of the bolts 38. The said blade holder 37 has an upwardly facing bearing surface or seat which engages the lower horizontal face of the head, and is provided with a flange 41 that lies in rear of the head and through which the attaching bolts 38 extend.

The upper shear blade 35 is provided at its ends with guide extensions 43, 43 which engage and slide vertically in the guide slots 16 of the cast metal guides 15, and said head is provided inside the end frames with the flanges 44 which bear against ribs 45 formed on the cast metal guides, as best shown in Fig. 3. The upper ends of said guide slots are closed by the caps 46 bolted or otherwise secured to the guide casting and adapted to support the oil cups through the medium of which oil is supplied to the sliding bearings of the head guide extensions. The said guide extensions are provided with endwise extending bearings 48 which extend through the upper end of and are thereby connected to the connecting rods or pitmen 49 located one at each end of the machine outside the end frames. The connecting rods are held on said bearings 48 by the disks 50 which are attached by screw bolts to the ends of said bearings. The said connecting rods 49 are formed at their lower ends to provide divided bearings 51 which engage eccentric disks 52 that are keyed to the ends of a drive shaft 53 by which means the shear head is moved toward and away from its work. Said shaft 53 is mounted in bearing bushings 54 mounted in the lower ends of the guide castings 15, as most clearly shown in Figs. 1 and 4. The lower stationary shear bolster is centrally thickened, as shown in Figs. 1, and is cut away, as shown in Fig. 4, to give room for the shaft 53. The shaft 53 extends beyond the right hand end of the machine and is rotatively mounted in a bearing 56 carried by a bracket 57 mounted on the base 33 (Figs. 1 and 2). The shaft is provided just inside of said bracket with a large gear wheel 58 which meshes with a pinion 59, (shown in dotted lines in Fig. 2) mounted on the power shaft 61 that is rotatively mounted at one end in said bracket 57, as indicated in Fig. 2, and at its other end in a bearing 63 mounted in the right hand frame member 11 (Fig. 4). The shaft 61 is provided outside of the bracket 57 with a fly or balance wheel 65, and is shown as provided inside of the bracket 57 with a tight and a loose pulley 66, 67, respectively, through the medium of which power may be applied to the drive shaft. Motive power may be otherwise applied to said shaft, as by being geared to a suitable motor.

In practice the main drive shaft 61 may be geared or connected to the motive power to rotate continuously, thereby rotating the gear wheel 58 continuously. Said gear wheel may be mounted to normally rotate loosely on the shaft 53, through the driving connections described, and arranged to be locked to the shaft 53, at times when it is desired to operate the shear head 35, by means of a clutch mechanism designated as a whole by 70, (Fig. 1) said clutch embracing a reciprocating, spring actuated clutch controlled pin 71 that is mounted in a bracket 72 which is attached to the right hand frame member of the machine. The clutch 70 may be made of any suitable type adapted to lock the gear wheel 58 to the drive shaft to operate the machine and arranged to release the gear wheel from said shaft to stop the machine.

The clutch actuating pin 71 is herein shown as actuated by a foot treadle, consisting of the pivoted levers 74, 74 and the foot bar 75 extending between and attached at its ends to the levers and arranged in front of the frame throughout its length. Said levers are arranged outside the end frames of the machine and are pivoted to the ends of a rod 76 that extends between, and extends at its ends beyond, said end frames at the lower sides thereof. The end of the pivot rod 76 at the right hand end of the machine extends some distance beyond the adjacent end frame so as to bring the adjacent treadle lever 74 beneath the clutch pin 71 for proper engagement therewith. The said clutch pin is bifurcated at its lower end and straddles the adjacent treadle lever 74 and is pivotally connected thereto by the pin 78, as best shown in Fig. 1. The treadle levers are provided at their rear ends with weights 79 which serve to normally hold the rear ends of said levers depressed and their forward ends elevated; and in this position of the parts the clutch actuating pin 71 is raised into position to operate the clutch to release or disconnect the gear wheel 58 from the drive shaft. The clutch pin is withdrawn, to permit the clutch to lock the gear wheel 58 to the drive shaft, by pressing the foot on the treadle bar 76, and when pressure is released the weights 79 return the clutch pin to its normal, clutch disconnecting position.

80 designates a stripper which is arranged in front of and is carried by the upper shear blade head 35. Said stripper is so arranged and adjusted thereon that when the said head and the upper shear is depressed to cut the material placed between the shears, the said stripper descends a limited distance with the shear head to bear against the work on the table, and a lost motion is provided between said head and stripper so that said head descends, relatively to the stripper, after the stripper has been arrested by engagement with the work. At the beginning of the rising movement of the head, therefore, it rises relatively to the stripper, the stripper acting by gravity on the work to hold it down while the shears are being separated, and in the final rising movement of the shear head the stripper is raised to its upper position. The construction of said stripper and the manner of mounting the same to produce the result set forth will now be described. The said stripper extends between the end frames in front of the head 35 and is provided at its ends with guide ribs 81 which engage vertically arranged grooved or channeled guides 83 that are attached, as by the rivets 84, to the inner sides of the end frames, as most clearly shown in Figs. 1 and 3, whereby said stripper is guided in its rising and falling movement. The said stripper is supported on the upper shear head through the medium of studs 86 which extend through apertures in the head and in the flange 41 of the upper shear blade holder, and are provided at their rear ends with nuts and the forward, enlarged ends 87 of said studs extend through vertical slots 88 formed in the stripper. Said nuts and the shouldered portions of the studs, formed by the enlarged ends 87 thereof, form means by which the upper shear holder is fixed to the head. Said stripper is provided at its ends with vertical screw-threaded shafts 89 which engage vertical screw-threaded openings in the stripper that extend downwardly from the upper margin of the stripper to the upper ends of the vertical slots 88 and bear at their lower ends on the enlarged ends 87 of the studs. Thus the stripper is supported on the studs through the intermediary of the adjusting screws 89. Said adjusting screws are provided at their upper ends with hand wheels 90 by which they may be turned to adjust the same. By turning said screws 89 downwardly against the supporting studs the stripper bar is raised relatively to the upper shear head, and vice versa, said screws thus providing means for adjusting the stripper to materials of different thicknesses. Such adjustment is desirable inasmuch as the stripper need be lifted only sufficiently to permit the work or material being operated upon to clear the lower edge of the stripper when inserting the work between the shears or other tools. The lower margin of said stripper, which is notched to provide a plurality of separate bearing points 92, which extend below the cutting edge of the upper shear blade such distance that when the head and stripper are lowered the lower edge of the stripper engages the work to hold the same on the table prior to the shearing engagement of the shears. Therefore when the upper shear is raised the said shears will be moved out of shearing engagement while the stripper is still resting by gravity on the work and performing its stripping function. When the enlarged ends of the studs 86, which move with the head, strike the lower ends of the screws 89, which occurs near the end of the rising movement of the head, the stripper is raised to permit the material to be again fed beneath the upper shear or other tool.

In order to accurately determine the extent of vertical adjustment of the stripper, the studs 87 may be provided with indicator pointers 94 which coöperate with scales 95 on the front face of the stripper, as most clearly shown in Fig. 1.

The machine may be converted into a gang punching machine by providing the vertically reciprocating head with a gang punch and the bolster with a series of dies to coöperate with the punches, as will be evident.

In operation, the stripper is adjusted with respect to the work table to bring the same, when the head occupies its uppermost position, at the proper distance from the table to correspond to the thickness or gage of the material being operated upon. The work is thereafter presented over the table below the upper shear, or other tool, and may be clamped thereon, if desired, through the medium of suitable clamping devices coöperating with the undercut grooves of the table, in a well known manner. Thereafter the treadle bar 76 is depressed to withdraw the clutch pin 71 and thereby permit the gear wheel 58, which rotates continuously during the operation of the machine, to be clutched to the drive shaft and to operate, through the medium of the eccentrics on the drive shaft and the connecting rods or pitmans 49, to depress the head and the upper shear or other tool to effect the proper operation on the material. Said treadle bar is held depressed until, in the continued rotation of the drive shaft, the head reaches its uppermost position, whereupon said treadle is released to permit the clutch pin to engage the clutch in a manner to disconnect the gear wheel 58 from the drive shaft.

I claim as my invention:—

1. A machine for the purpose set forth comprising two end frames with means for rigidly connecting them, each end frame consisting of two plates and interposed filler members, with means piercing the plates and filler members to rigidly connect them, the filler members of said end frames embracing vertically slotted castings, a bolster extending transversely between the end frames and rigidly connected thereto to support a tool, a vertically reciprocable head over the bolster provided with guide extensions engaging the slots of said castings, a tool carried by the head to coöperate with a tool supported on the bolster, a horizontal drive shaft below the bolster rotatively mounted in bearings in said end frames and means operatively connecting the drive shaft with bearings at the ends of said head for reciprocating the latter through rotation of the drive shaft.

2. A machine for the purpose set forth comprising two end frames with means for rigidly connecting them, each frame consisting of two plates and interposed filler members, with connecting means piercing the plates and filler members, the filler members of said end frames embracing vertically slotted castings arranged at the front of the frames, a bolster extending transversely between, and rigidly connected at its ends to, said castings to support a tool, a vertically reciprocable head over the bolster provided with guide extensions engaging the slots of said castings, a tool carried by the head to coöperate with a tool supported by the bolster, a horizontal drive shaft below the bolster, bearings in the lower ends of said castings in which said drive shaft is rotatively mounted, and operative connections, outside said end frames for connecting the drive shaft with the end bearings of the head to reciprocate the latter through rotation of the drive shaft.

3. A machine for the purpose set forth comprising two end frames with means for rigidly connecting them, each frame consisting of two plates and interposed filler members, with connecting means piercing the plates and filler members, the filler members of said end frames embracing vertically slotted castings arranged at the front of the frames, and other filler members arranged between the plates at the margins of the frames, a bolster extending transversely between the frame and rigidly connected at its ends to said castings to support a tool, a vertically reciprocable head over the bolster provided with guide extensions engaging the slots of said castings, a tool carried by the head to coöperate with a tool supported by the bolster, a horizontal drive shaft below said bolster and mounted in bearings in the lower ends of said castings and operative connections, outside the end frames, connecting the drive shaft with end bearings of the head to reciprocate the latter through rotation of the drive shaft.

4. A machine for the purpose set forth comprising two end frames with means for rigidly connecting them, each frame consisting of two plates and interposed filler members, with means piercing the plates and filler members to rigidly connect them, the filler members of said end frames embracing vertically slotted castings arranged at the front of the frames, a bolster extending transversely between and rigidly connected at its ends to said castings to support a tool, a vertically reciprocable head over the bolster extending between the end frames and provided with guide extensions engaging the slots of said castings, and beyond said extensions with end bearings, a tool carried by the head to coöperate with a tool supported on the bolster, a horizontal drive shaft arranged beneath the head and rotatively mounted in bearings carried by the lower ends of said slotted castings and provided outside said end frames with eccentrics, and pitmen connecting the eccentrics with the end bearings of said head.

5. A machine for the purpose set forth comprising a frame embracing a bolster to support a tool, a vertically reciprocable head over the bolster provided with a tool to coöperate with the tool supported by the bolster and a stripper supported on the head by means permitting lost motion between the head and stripper, with means to vary the extent of said lost motion.

6. A machine for the purpose set forth comprising a frame embracing a bolster to support a tool, a vertically reciprocable head over the bolster provided with a tool to coöperate with the tool supported by the bolster, a stripper supported on the head by means permitting lost motion between the head and stripper, and means for adjusting the stripper on the head toward and from the bolster.

7. A machine for the purpose set forth comprising a frame embracing a bolster for supporting a tool, a vertically reciprocable head over the bolster provided with a tool to coöperate with a tool supported by the bolster, a stripper arranged in front of the head, supporting means for the stripper carried by the head and extending forwardly therefrom, the head being provided with a vertical slot through which said supporting means extend, and an adjusting screw carried by the stripper and bearing at its lower end on said supporting means.

8. A machine for the purpose set forth comprising a frame embracing a bolster to support a tool, a vertically reciprocable head over the bolster provided with a tool to coöperate with a tool supported by the bolster, a stripper arranged in front of the head, supporting means for the stripper carried by the head, the stripper being provided with a vertical slot through which the supporting means extend to provide lost motion between the stripper and head, and means for adjusting the stripper on the head toward and from the bolster, and an indicator carried by the supporting means adapted to coöperate with a scale on the stripper to determine the adjustment of the stripper.

9. A machine for the purpose set forth comprising end frames rigidly connected together, a bolster extending between the end frames to support a tool, a vertically reciprocable head above the bolster having guiding engagement with the end frames and provided with a tool to coöperate with the bolster tool, a stripper arranged in front of said head and extending between and having guiding engagement at its ends with the end frames, means whereby said stripper is supported on said head, and means affording lost motion between the head and stripper, with means for varying the extent of said lost motion.

10. A machine for the purpose set forth comprising a frame embracing a bolster, a vertically reciprocable head having guiding engagement with the frame above the bolster, a tool holder bolted to the head and having means for attaching a tool thereto, and a stud extending through the tool holder and head and constituting additional means for attaching the tool holder to the head, said stud extending forwardly from the head, and the stripper being provided with a vertical slot through which said stud extends, whereby the stripper is supported on the head by means permitting lost motion between the said parts.

In testimony that I claim the foregoing as my invention I affix my signature in the presence of two witnesses, this 8th day of November A. D. 1910.

HANS B. KRAUT.

Witnesses:
W. L. HALL,
WILLIAM GOLDBERGER.